(12) United States Patent
Susairaj et al.

(10) Patent No.: US 8,239,486 B2
(45) Date of Patent: Aug. 7, 2012

(54) DIRECT NETWORK FILE SYSTEM

(75) Inventors: Margaret Susairaj, Sunnyvale, CA (US); Richard L. Frank, Naples, FL (US); Sumanta Chatterjee, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 628 days.

(21) Appl. No.: 12/051,816

(22) Filed: Mar. 19, 2008

(65) Prior Publication Data

US 2009/0240783 A1 Sep. 24, 2009

(51) Int. Cl.
*G06F 15/16* (2006.01)

(52) U.S. Cl. ........................................................ 709/218

(58) Field of Classification Search .......... 709/217–219; 719/328–330
See application file for complete search history.

(56) References Cited

U.S. PATENT DOCUMENTS

| | | | |
|---|---|---|---|
| 5,737,523 A * | 4/1998 | Callaghan et al. | 709/225 |
| 6,606,690 B2 * | 8/2003 | Padovano | 709/220 |
| 6,742,051 B1 * | 5/2004 | Bakshi et al. | 719/318 |
| 7,165,096 B2 | 1/2007 | Soltis | |
| 7,266,555 B1 * | 9/2007 | Coates et al. | 707/827 |
| 2002/0103954 A1 * | 8/2002 | Karamanolis et al. | 710/105 |
| 2003/0145230 A1 * | 7/2003 | Chiu et al. | 713/201 |
| 2003/0154236 A1 * | 8/2003 | Dar et al. | 709/201 |
| 2005/0210479 A1 * | 9/2005 | Andjelic | 719/321 |
| 2005/0251500 A1 * | 11/2005 | Vahalia et al. | 707/1 |
| 2005/0251516 A1 * | 11/2005 | Stakutis et al. | 707/10 |
| 2007/0093124 A1 * | 4/2007 | Varney et al. | 439/499 |
| 2007/0100792 A1 * | 5/2007 | Lent et al. | 707/1 |
| 2007/0255802 A1 * | 11/2007 | Aloni et al. | 709/217 |
| 2008/0168479 A1 * | 7/2008 | Purtell et al. | 719/328 |
| 2008/0281908 A1 * | 11/2008 | McCanne et al. | 709/203 |

OTHER PUBLICATIONS

HP News Release; "HP Advances StorageWorks Technology with Deployment of Oracle Database 11g"; http://www.hp.com/hpinfo/newsroom/press/2007/070711xa.html; downloaded Nov. 30, 2007.
Oracle Corporation; Oracle Database Concepts, 10g Release 2 (10.2), Part No. B14220-02, "9 Process Architecture."
Oracle Corporation; Oracle Database Concepts, 10g Release 2 (10.2), Part No. B14220-02, "1 Introduction to the Oracle Database."
Oracle Corporation; Oracle Database 11g, Direct NFS Client, An Oracle White Paper, Jul. 2007.
Sun Microsystems, Inc., "NFS Version 3 Protocol Specification," Network Working Group, Request for Comments: 1813, Category: Informational, Callaghan et al.

* cited by examiner

*Primary Examiner* — Ajay Bhatia
(74) *Attorney, Agent, or Firm* — Kilpatrick Townsend & Stockton LLP

(57) ABSTRACT

A computer-implemented method of implementing a network file system may include steps of providing a host, the host including an Operating System (OS) that includes a kernel and a first client implementing the Network File System (NFS) protocol in the kernel, and a database server process. A second NFS client may be provided in the database server process. A NFS server may be provided, coupled to the host. A device implementing the Network Attached Storage (NAS) protocol may also be provided, coupled to the NFS server. NFS requests to access data stored in the NAS server may then be generated and sent from the second NFS client in the database server process directly to the NFS server, bypassing the first NFS client in the OS kernel of the host. NFS File handles obtained by one database process may be shared with other database processes through a shared memory area.

19 Claims, 4 Drawing Sheets

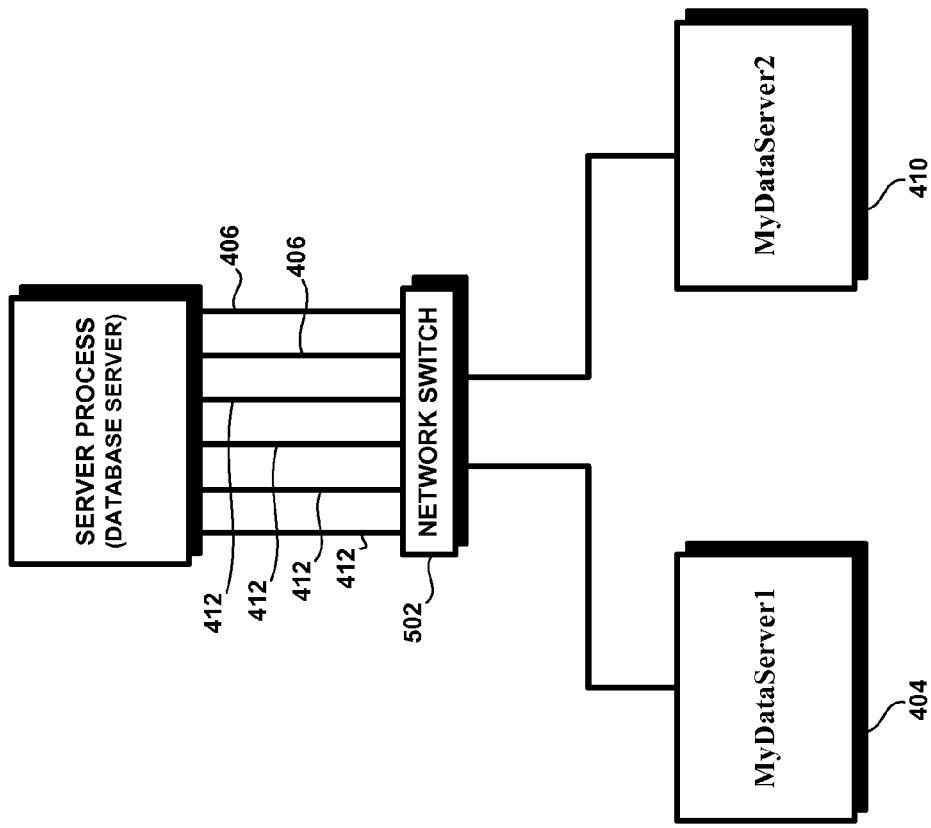
```
402 ─┐
       server:   MyDataServer1
404 ─┤ path:     132.34.35.12
406 ─┤ path:     132.34.35.13
408 ─┤ export:   /vol/mydata1 mount: /mnt/mydata1
410 ─┤ server:   MyDataServer2
       path:     NfsPath1
412 ─┤ path:     NfsPath2
       path:     NfsPath3
       path:     NfsPath4
       export:   /vol/mydata2 mount: /mnt/mydata2
414 ─┤ export:   /vol/mydata3 mount: /mnt/mydata3
       export:   /vol/mydata4 mount: /mnt/mydata4
       export:   /vol/mydata5 mount: /mnt/mydata5
```
FIG. 4
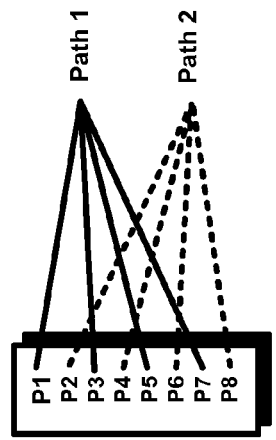
FIG. 5
FIG. 6

DIRECT NETWORK FILE SYSTEM

BACKGROUND OF THE INVENTION

The present invention relates to the field of computer-implemented methods and systems for accessing files using a Network File System (NFS) protocol. More particularly, the present invention relates to computer-implemented methods and systems for implementing a direct network file system within a database instance.

SUMMARY OF THE INVENTION

According to an embodiment thereof, the present invention is a computer-implemented method of implementing a network file system. The method may include steps of providing a host, the host including: an Operating System (OS) that may include a kernel and a first client implementing the Network File System (NFS) protocol in the kernel, and a database server process, the database server process including a second NFS client; providing a NFS server and coupling the NFS server to the host; providing a device implementing the Network Attached Storage (NAS) protocol and coupling the NAS device to the NFS server; generating and sending a first NFS request to access data stored in the NAS device from the second NFS client in the database server process directly to the NFS server, bypassing the first NFS client in the OS kernel of the host.

The method may also include a step of requesting an NFS file handle from the NFS server, receiving the requested NFS handle and storing the received NFS handle in a shared memory area that is accessible to other processes within the database server process. The method may also include providing a first database process generating a first pointer to the file handle stored in the shared memory area and storing the generated first pointer in a first local file structure accessible to the first database process, and a second database process generating a second pointer to the file handle stored in the shared memory area and storing the generated second pointer in a second local file structure accessible to the second database process. The method may also include first and second database processes generating and sending a respective first and second NFS requests to the NFS server to access data stored in the NAS device, each using the NFS handle stored in the shared memory area. A step of servicing both first and second NFS requests from the second NFS client in the database server process may be carried out, to the exclusion of the first NFS client in the OS kernel of the host. Steps may be carried out of generating and sending a second NFS request to access the data stored in the NAS server without requesting the NFS file handle from the NFS server. The method may also include freeing the shared memory area for use by another database process when a file object referenced by the requested, received and stored file handle is closed. The OS may include functionality to cache of frequently used blocks of data and the method further may include switching off the file system caching functionality of the OS and enabling the database server process to administer caching of the frequently used blocks of data. The method may also include coupling a plurality of NIC devices between the NFS server and the host, each NIC device providing a socket connection between the database server process of the host and the NFS server. The method may also include a step of generating a NIC configuration file, the NIC configuration file including an identification of at least the NFS server, a plurality of network paths to the identified NFS server and at least one local mount point for each identified NFS server. A step of assigning each process of the database server process that requests access to the data stored in the NAS device from the NFS server to one of the plurality of network paths included in the NIC configuration file, may also be carried out. The assigning step may be carried out in a round-robin fashion. The method may also include monitoring each of the plurality of network paths and, upon failure of a monitored network path, re-assigning the process assigned to the failed network path to another one of the monitored network paths and updating the NIC configuration file to reflect the failed network path. A step of detecting when a failed network path becomes newly available and updating the NIC configuration file may be carried out, to reflect the availability of the newly available network path. A step of dedicating one of the plurality of NIC devices to a predetermined process with the database server process may also be carried out. A fallback NIC device may be provided to the dedicated NIC device assigned to the predetermined process within the database server process.

According to another embodiment thereof, the present invention is a computer system for implementing a network file system. Such a computer system may include a host, the host including: at least one processor; at least one data storage device coupled to the at least one processor; an Operating System (OS) that may include a kernel and a first client implementing the Network File System (NFS) protocol in the kernel, and a database server process, the database server process including a second NFS client; a NFS server coupled to the host; a device implementing the Network Attached Storage (NAS) protocol coupled to the NFS server, and a plurality of processes spawned by the at least one processor, the processes including processing logic for generating and sending a first NFS request to access data stored in the NAS device from the second NFS client in the database server process directly to the NFS server, bypassing the first NFS client in the OS kernel of the host.

Yet another embodiment of the present invention is a machine-readable medium having data stored thereon representing sequences of instructions which, in a computer system for implementing a network file system, comprising: a host, the host including: at least one processor; at least one data storage device coupled to the at least one processor; an Operating System (OS) that may include a kernel and a first client implementing the Network File System (NFS) protocol in the kernel, and a database server process, the database server process including a second NFS client; a NFS server coupled to the host, and a device implementing the Network Attached Storage (NAS) protocol coupled to the NFS server, causes the host computing device to implement a network file system, by carrying out steps of generating and sending a first NFS request to access data stored in the NAS device from the second NFS client in the database server process directly to the NFS server, bypassing the first NFS client in the OS kernel of the host.

Yet another embodiment of the present invention is a computer-implemented method of implementing a network file system that may include steps of providing a host, the host including: an Operating System (OS) that may include a kernel, and a database server process, the database server process including a NFS client; providing a NFS server and coupling the NFS server to the host; providing a device implementing the Network Attached Storage (NAS) protocol and coupling the NAS device to the NFS server; generating and sending a first NFS request to access data stored in the NAS device from the NFS client in the database server process directly to the NFS server, bypassing the OS kernel of the host.

BRIEF DESCRIPTION OF THE DRAWINGS

FIG. 4 shows an example of a NIC configuration file, according to an embodiment of the present invention.

FIG. 5 is a block diagram showing network paths between server processes and NFS servers, to illustrate further aspects of embodiments of the present invention.

FIG. 6 is a block diagram illustrating the assignment of processes to predetermined socket connections, according to embodiments of the present invention.

DETAILED DESCRIPTION

A database (such as an Oracle database, for example) may be hosted by different types of storage—direct attached, Storage Area Network (SAN) or Network Attached Storage (NAS), for example. NAS storage is gaining popularity for its ease of use and its ability to scale as the size of storage grows. NAS storage is usually accessed through a Network File System/iSmall Computer Systems Interface (NFS/iSCSI) protocol. An instance of a database that uses NAS storage conventionally relies upon an NFS client that is located within the Operating System (OS) kernel to communicate with an NFS server in the NAS to perform the Input/Output (I/O). Indeed, NFS is a distributed filesystem that allows applications to access and share data across different nodes coupled to a network (such as a Gigabit or Infiniband network, for example). Indeed, NFS is a network file system protocol originally developed by Sun Microsystems in 1984, allowing a user on a client computer to access files over a network as easily as if the network devices were attached to its local disks. NFS, like many other protocols, builds on the Open Network Computing Remote Procedure Call (ONC RPC) system. The Network File System protocol is specified in RFC 1094, RFC 1813, and RFC 3530. Conventionally, the NFS server exports the filesystem to a set of clients and the clients mount (preferably using TCP/IP) the filesystems in their host. Thereafter, the clients may thereafter access the exported data using the NFS procedures as if, from the clients' perspective, such exported data was local to the clients. The NFS procedure opcode and parameters are sent in a uniform network format and not in a host-specific format. This allows data access across different platforms with different architectures. The NFS v3 protocol specification can be found at http://www.faqs.org/rfcs/rfc1813.html, which specification is incorporated herein by reference in its entirety. Standard NAS vendors implement the NFS server protocol in their servers according to this specification to enable NFS clients to access the files stored in the NAS. These NFS clients may be from different system architectures or operating systems.

Figure 1:
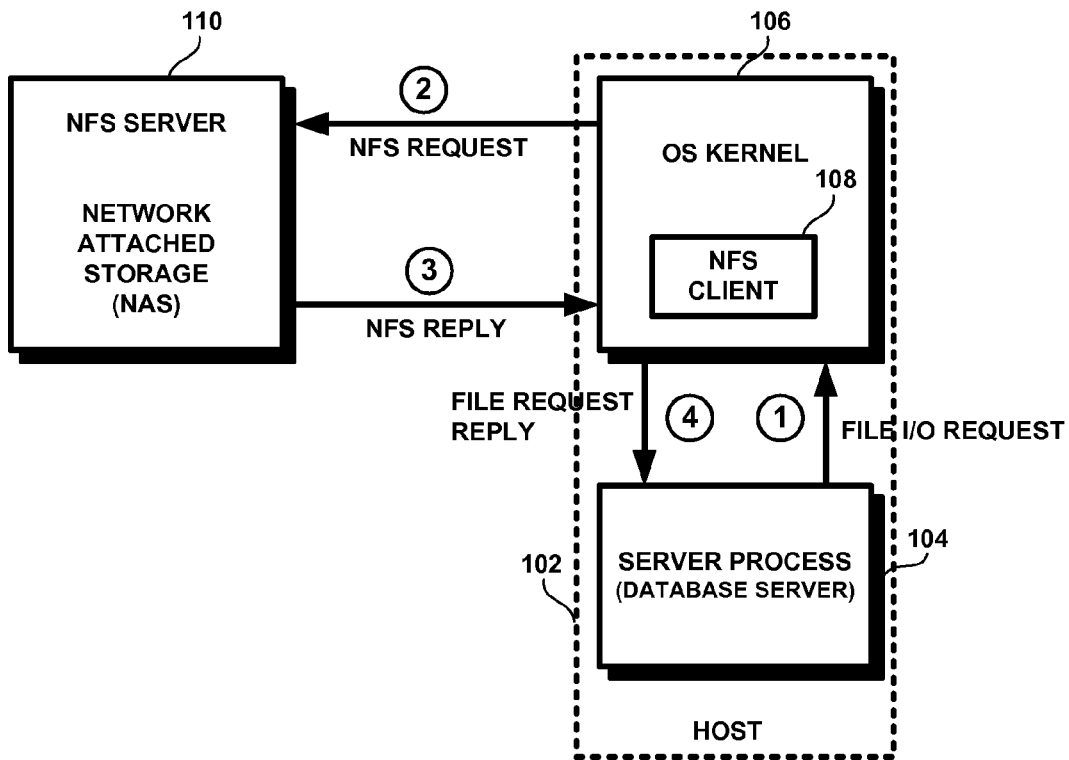
FIG. 1 is a block diagram illustrating a conventional method by which an NFS client may request and obtain files from a NFS server on behalf of a server process.

Once the NFS server has exported a filesystem and the NFS client has mounted the exported filesystem inside the client as an NFS mount point, the client may thereafter access the mounted data as if the mounted data were local. However, each access to the exported filesystem still requires a request/reply cycle across the network, with the NFS client within the OS kernel handling the transaction on behalf of the process within the client. FIG. 1 is a block diagram illustrating a conventional method by which an NFS client may request and obtain files from a NFS server on behalf of a server process, which is a process that runs database server code. As shown, host 102 includes a server process 104 and an OS kernel 106. The OS kernel 106 conventionally includes an NFS client 108, which handles I/O requests on behalf of the server process 104 for files located on the NFS server 110. As shown, conventionally, a process within the host 102, such as server process 104, sends an NFS file I/O request (in the form of an open sys call, for example) to read or write to a file to the OS kernel, as shown at (1) in FIG. 1. The NFS client 108 within the OS kernel 106 recognizes that the request is an NFS request and handles this request on behalf of the process 104. The NFS client 108 determines whether the requested file can indeed be opened—that is, the NFS client determines whether the requested file has been previously exported by the NFS server 110 and mounted by the host 102. If so, the NFS client sends an NFS request (as a Remote Procedure Call (RPC), for example) to the NFS server as shown at (2), giving the NFS server 110 any necessary authorization and file information. The NFS server 110 services this request by accessing the requested file and by generating a file handle and sends the generated file handle back in its reply, as shown at (3). The NFS client 108 then stores the returned file handle in a file handle table. A file descriptor is then associated with the returned file handle, and the file descriptor is returned in the reply (4) of the NFS client 108 to the server process 104, in response to the open sys call from the requesting process 104. The file descriptor may be thought as an index into the file handle table and is used to perform any I/O on the requested file object. The process 104 may then read or write to the requested file using the file descriptor. For example, the process 104 may issue a read system call to the NFS server 110, identifying the requested file, providing the received file descriptor, and identifying a buffer and a length of the requested read. In response to the read system call, the NFS client 108 within the host's OS kernel 106 receives the file name, the file descriptor, buffer and length information and carries out a kernel mode access by retrieving the associated file handle from the file handle table and sending a properly NFS-formatted request to the NFS server.

When a database (such as an Oracle database, for example) is stored in a NAS server, the conventional kernel based implementation above does not provide the necessary behavior that is needed for a database to be consistent and recoverable. Indeed, the user must use special care in selecting the mount options that can be specified when the server file system is mounted on the client, so as to insure data correctness, as well as data consistency and database recoverability. Indeed, the manner in which the filesystem is mounted will determine the manner in which data is transferred between the NFS server 110 and the NFS client 108 within the OS kernel 106. For example, an NFS volume may be mounted with different parameters for reading and for writing, where the value specified dictates the transfer size used by the NFS protocol. One such mount option is the rsize option. The read size mount option (rsize=n) sets the number of bytes that NFS uses when reading files from an NFS server. The value of the rsize mount option is negotiated between the server and client to determine the largest block size that both can support. A block may be defined as the smallest logical unit of data storage in a database. One data block corresponds to a specific number of bytes of physical database space on disk. The value specified by the rsize option is the maximum block size that could be used, but the actual size used for reads may be smaller. However, setting the rsize value to a value that is smaller than the largest block size supported by the database, as users may inadvertently do when manually and individually configuring the mount options, adversely affects read performance. Similarly, the write size mount option (wsize=n) sets the number of bytes NFS uses when writing files to an NFS server. The value of the wsize mount option may also be negotiated between the server and client to determine the largest block size that both can support in a write operation. As with the rsize mount option, the value specified by this mount option is the maximum size that could be used; however, the actual size used may be smaller. Setting this size to a value that is smaller than the largest block size supported by the database will also adversely affect performance.

For example, mounting a file system with a value that is smaller than the block size used by the database may cause database data block writes to be split into multiple data chunks, which can result in inefficient fractured block writes. For example, a 64 Kb block may be split into 16 blocks of 4 Kb that match the 4 Kb set by the user for the wsize mount option, which may lead the NAS to write each of the 16 4 Kb blocks to disk individually as they arrive, leading to possible out-of-order blocks and significant performance penalties. If the client or server dies in the middle of a write operation, this fractured block write may require an expensive media recovery for the database to be available again. To avoid such problems, database vendors may require that the NFS file system be mounted with an rsize/wsize that is greater than the database block size supported by the database platform. Setting the value of the rsize mount option to be smaller than the database block size may also result in reading a block image that looks fractured, since the NFS server may not have a full image of the block due to writes coming in two different NFS operations.

If and when the NFS server fails to respond (i.e., times out) and a "Server Not Responding" or similar message is generated in response to a read or write request, the database may experience an I/O error unless the request is repeated until satisfied. To insure that read and write requests are repeated indefinitely until contact is re-established with and a reply is received from the NFS server, another mount parameter; namely, "hard" is usually set by default. However, this mount option, like wsize and rsize, may be set by the customer. Settings other than "hard", which may be set when the customer overrides the "hard" option, may cause the database to experience unwarranted I/O errors when, for example, the database times out before, for example, successfully servicing a write request.

However, the above user-settable options are not the only mount options of which the user should be aware. Indeed, with reference to FIG. 1, the NFS client 108 within the OS kernel 106 also maintains a cache of the attributes of all recently accessed directories and files. This allows a client to check its cache for the requested file before making a request to the NFS server. The length of time each entry is kept in the cache may also be set through a number of user-selectable mount options. Such attribute caching mount options, for Linux clients, currently include the following:

Acregmin=n The minimum time in seconds that attributes of a regular file should be cached before requesting fresh information from a server. The default is 3 seconds.

Acregmax=n The maximum time in seconds that attributes of a regular file can be cached before requesting fresh information from a server. The default is 60 seconds.

Acdirmin=n The minimum time in seconds that attributes of a directory should be cached before requesting fresh information from a server. The default is 30 seconds.

Acdirmax=n The maximum time in seconds that attributes of a directory can be cached before requesting fresh information from a server. The default is 60 seconds.

Actimeo=n Using actimeo sets all of acregmin, acregmax, acdirmin, and acdirmax to the same value. There is no default value.

The mount option actimeo specifies how often file attribute should be refreshed from the server. When the database resizes database files, it sends a message to the nodes in the Real Application Cluster (RAC) server (which allows multiple concurrent database instances to share a single physical database) to pick the new size. If the attribute caching is not set to zero (no attribute caching), this can result in a wrong file size being picked by the other nodes. Hence setting actimeo=0 is important to maintain data consistency and correctness. However, since this mount option may be set to a value other than zero by the user, there is a danger that the database will become corrupted through the user mistakenly setting this mount option to an erroneous value.

The aforementioned mount options are specific to Linux clients. However, there are similar mount options for other operating systems, which must be set by the user or which must default to the appropriate value to insure the correctness of the database. Setting these mount options to the wrong value can, therefore, seriously degrade the performance of the database in the best case and cause serious I/O errors in the worst case. Apart from the correctness issue, the conventional NFS client 108 provided by the OS kernel 106 is also not performant for database systems that are I/O intensive. In the case of a single physical database (such as a NAS administered by an NFS server, for example) being processed by multiple database instances (such as the case in a RAC), writes carried out by one of the multiple database instances may not be immediately visible to other ones of the multiple database instances. This leads to data consistency problems, as the OS kernel may have cached the just-written block (to allow other processes to read the cached block without requiring an access to the NFS server 110) and may not yet have written the updated block to storage, leading to cache coherency issues. Indeed, NFS (a stateless protocol) was not designed to be cache coherent, as the duties related to maintaining cache consistency are conventionally left to the application. Moreover, the NFS protocol includes filesystem level reader/writer locks that serializes file writes; that is, that allows only a single write operation to be in progress at any time to a given file, which is not optimal for an I/O intensive database system in which many processes should have the ability to access a same file concurrently. However, the relative high cost of SAN storage as compared to NAS storage has led vendors to favor NAS storage and to adapt it for use with the NFS protocol and databases, however inefficiently.

Figure 2:
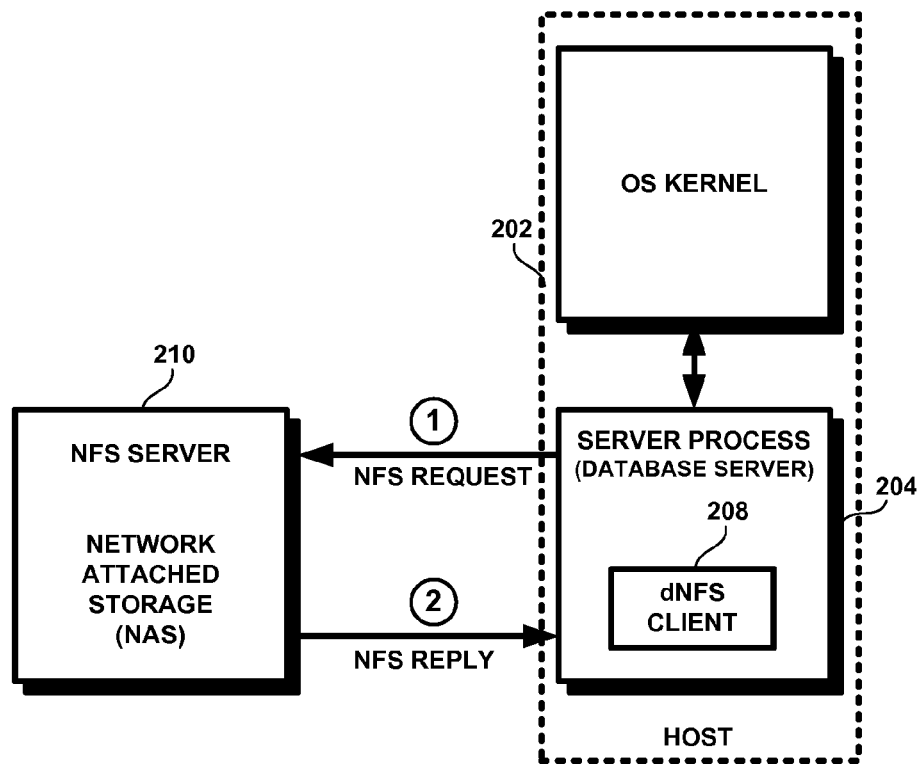
FIG. 2 is a block diagram of an embodiment of the present invention.

FIG. 2 is a block diagram of an embodiment of the present invention. Embodiments of the present invention may be termed "dNFS" or "Direct NFS", and solve the problems described above by implementing the NFS client protocol within the process that handles the requests of user processes (e.g., applications) coupled to the database instance; that is, the server process. As shown in FIG. 2, in a dNFS environment according to embodiments of the present invention, NFS files are accessed by directly communicating with the storage NFS server 210 using NFS protocol, bypassing the NFS client in the OS kernel of the host 202. In a dNFS environment according to embodiments of the present invention, opening a file that is hosted by the NFS storage server includes several steps that were earlier performed by the OS kernel 106. First, as the OS kernel-based NFS client is not used, it is the database server process 204 that uses the mount protocol to obtain the mount point handle of the directory that is exported by the NFS server where the database file resides. As shown in FIG. 2, once the mount point handle is obtained, the dNFS client 208 within the process 204 requests (1) and obtains (2) the NFS file handle of the file that the server process 204 seeks to open (using, for example, a look-up procedure for which the mount point handle is needed), after the NFS server 210 determines that the dNFS client has sufficient privileges to be given the requested file handle. File handles may be obtained using a LOOKUP procedure, as defined in the NFS v3 protocol specification previously incorporated herein. If the LOOKUP procedure is successful, the file handle of the file object within the NAS is returned, along with file attributes. In case of failure of the LOOKUP procedure, the file handle is not returned and only directory attributes are returned. The NFS file handles (opaque data structures that may be up to, for example, 64 bytes) identify file system objects on the remote NFS server 210 and are persistent until the file object is removed from the NFS file server 210. Once the file object is removed from the NFS server 210, the file handle may be re-used to identify another new object that is created on the server. According to embodiments of the present invention, once a file handle is obtained by the server process 204 (and not by the OS kernel, as occurred conventionally), the obtained file handle may be used in subsequent file I/O operations, as described in greater detail with reference to FIG. 3 below.

Figure 3:
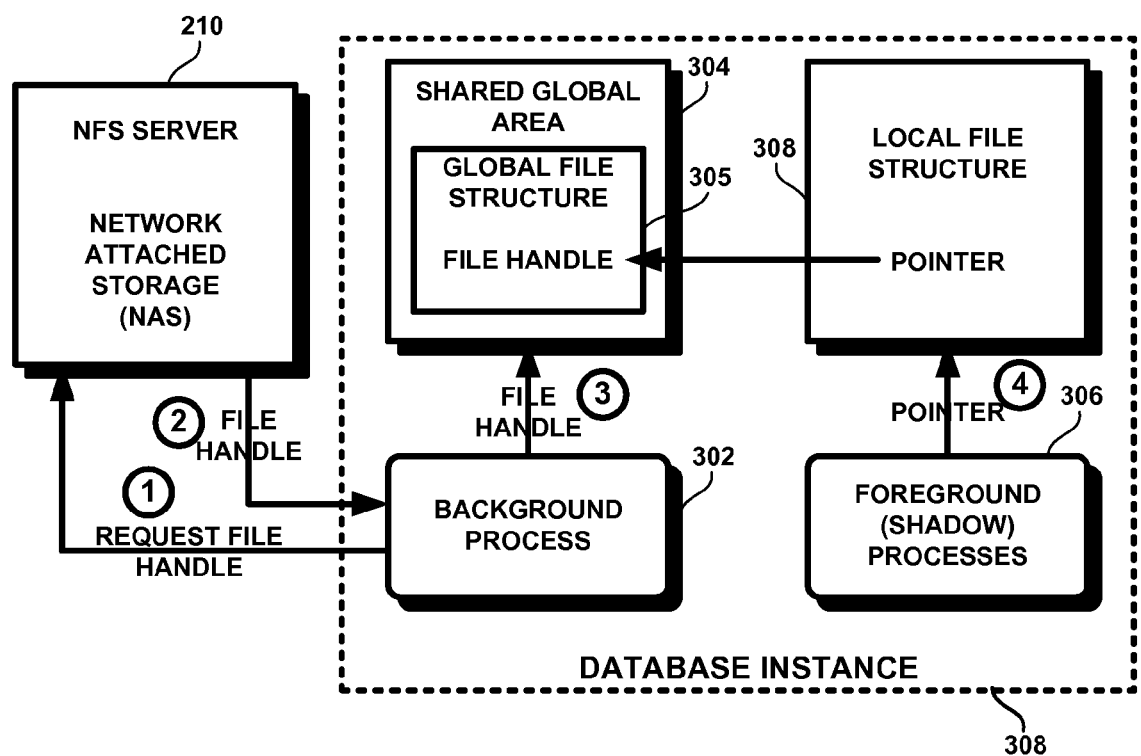
FIG. 3 is a block diagram that illustrates aspects of an embodiment of the present inventions.

Since communicating with the NFS server 210 requires the file handles, one embodiment of the present invention calls for each process within a database instance to obtain the file handles for the files it wishes to access, and to use these file handles to communicate with the NFS server. According to another embodiment of the present invention and contrary to conventional OS-based NFS clients, a file handle obtained need not be used only by the database process that obtained it. Indeed, since NFS file handles are specific to a file and are not associated with the NFS session that obtained the file handle, the file handle may, according to embodiments of the present invention, be shared across processes in an instance of the database. As shown in FIG. 3, an instance of a database 308, according to embodiments of the present invention, may include a plurality of background processes 302 configured to obtain file handles; a plurality of foreground (shadow) processes 306 that access the same set of files, and a shared global area (SGA) 304. Background processes are used to maximize performance and to accommodate multiple users. Such background processes may include, for example, a database writer process, a log writer process, a checkpoint process, a system monitor process, and recovery, job queue and archiving background processes, among others. Such background processes may be created automatically when a database instance is started. The shared global area SGA 304 is a shared memory area that is shared by and accessible to a plurality of processes within a database instance. It is to be noted that the I/O stack that accesses the files on the NAS through the NFS server is common to the background and foreground (shadow) processes. By storing the file handles obtained from the NFS server process in a shared memory area such as the SGA 304, a plurality of processes may access and write to a file concurrently, with the database maintaining synchronization. Every time a database is started, an SGA 308 may be allocated and background processes 302 automatically created and started. The SGA 308 is preferably de-allocated when the database instance shuts down. The foreground (shadow) processes 306 are created as a result of a client connection that are running a SQL query or carrying out an update or other database-specific operation. A connection may be thought of as a communication pathway between a user process and a database instance. A communication pathway may be established using available interprocess communication mechanisms (on a computer that runs both the user process and the database) or network software (when different computers run a database application and the database, and communicate through a network).

In the conventional NFS client/server architecture (such as shown in FIG. 1), NFS files are accessed through a conventional file access method that includes an open ( ) system call. As noted above, the open system call returns a file descriptor which is used by the server process in subsequent accesses to the file. dNFS, according to embodiments of the present invention, shares file handles across processes within a database instance through a process by which a single background process 302 requests (1) and obtains (2) the file handle for a particular file, which is then available to other processes within the database instance. No open( ) system call is needed, according to embodiments of the present invention. The obtained file handle may then be stored in a Global File Structure (GFS) 305 within the SGA 304. Thereafter, other foreground processes spawned as a result of client connections within the database instance may share and use the file handle through access to the GFS 305 within SGA 304, although a separate file pointer to the file handle stored in the GFS 305 should be obtained by each foreground (shadow) process. A foreground (shadow) process is a server process that is created on behalf of and associated with a single user process and acts only on behalf of the associated user process. Such a configuration maintains a one-to-one ratio between the number of user processes and server processes. Even when the user is not actively making a database request, the foreground (shadow) process remains (though it may become inactive and may be paged out on some operating systems).

Note that, according to embodiments of the present invention, only one access per file is needed to obtain a file handle that may thereafter be used by many foreground (shadow) processes for subsequent accesses by many user processes to that file. The NFS server 210 is still accessed during an actual read or write, but only one access thereto is needed to secure the file handle for that file object, which file handle may thereafter be used by many processes.

As shown in FIG. 3, a background process 302 obtains a file handle and stores the obtained file handle in a GFS 305 in the SGA 304. The GFS 305, being located in the GSA, is known and available to other foreground (shadow) processes 306 within the database instance. According to embodiments of the present invention, a separate background process 302 may be created for each file to be accessed and a separate GFS 305 is created to store the file handle within the SGA for each file to be accessed. Thereafter, when a foreground (shadow) process requires access to a file for which a file handle has previously been obtained (and assuming the file is not present in the cache administered by the database), the foreground (shadow) process 306 creates a Local File Structure (LFS) 308 that contains a pointer to the GFS 305 for that file within the SGA 304. This allows the foreground (shadow) process to access the required file from the NFS server 210 without first requesting and obtaining a file handle from the NFS server 210. This indirection provides a significant benefit within the context of I/O intensive database environments as it eliminates the need to obtain a file handle from the NFS server 210 before an access to a file stored within the NAS administered by the NFS server 210 may be accessed and written, assuming that the file handle already exists and has previously been stored within the GFS 305 of the SGA 304. This embodiment scales well as the number of client connections (and thus foreground (shadow) processes) and the number of files to access increases.

When a foreground (shadow) process submits a read request, it is first determined whether the file that is the subject of the read is configured for dNFS for this database instance. The read request from the foreground (shadow) process (issued as a result of a client connection) will come with a pointer to the LFS 308, which may then used to get the file handle within the GFS 305 for the requested file. The file handle may then be used to generate a NFS request including a read Remote Procedure Call (RPC), with the file handle as a parameter, together with an offset value and a length value, to fully characterize the read. Instead of transitioning into the NFS client of the OS kernel, as is the case with the conventional NFS protocol, embodiments of the present invention, call for each foreground (shadow) process to have a socket (network) connection to the NFS server that administers the NAS. The read request is sent through the socket connection to the NFS server 210. The NFS server 210 receives the read request, determines the file object referenced by the included file handle, gets the corresponding data and sends the data back to the NFS client 208 within database server 204, which makes the data available to the requesting process. Write requests are also serviced through a socket connection to the NFS server 210, which executes the request and sends a write acknowledgment back to the NFS client 208.

According to embodiments of the present invention, if the process that obtained the NFS file handle decides to close the file for which the file handle was obtained, the background process 302 may free the GFS 305 that held the file handle and may then use the GFS 305 to store another file handle for some other file object within the NFS server 210. The other processes in the database instance should, thereafter, be notified of the freeing up of the GFS 305 that held the file handle for the closed file, so that these processes do not use an invalid NFS file handle (i.e., a file handle for a different file object than was intended). This housekeeping may be carried out by maintaining a sequence number/incarnation number for each GFS 305 in the SGA 304.

Indeed, the GFS 305 maintained by the database instance may be identified, for example, by an 8 byte value where the first four bytes represent a memory address and the second four bytes represent a sequence number. The combination of these two values may then be used to uniquely identify a NFS file handle of a specific file object in the NFS server. When the process that has requested access to the file object decides to close the file and the background process 302 frees the GFS 305 containing the file handle for the closed file, the GFS 305 may be reused for some other file, and the sequence number may be incremented. Incrementing the sequence number (while keeping the 4 byte memory address of the GFS the same) may then be interpreted by other processes as a signal to stop using the shared file handle stored in the GFS 305. Recall that in the conventional OS kernel-based model shown and described relative to FIG. 1, each process requiring access to a file object had to request a file handle and obtain a file handle to be used in subsequent I/O operations. According to embodiments of the present invention, obtaining a file handle in one single process and sharing the file handle in a GFS 305 within the SGA 304 across multiple processes reduces the overhead seen in conventional OS kernel-based model. Significant gains are seen, using embodiments of the present invention, in multi-process database applications, where it is not uncommon for several application processes to access the same set of files.

In contrast to the NFS client within the OS kernel model and according to embodiments of the present invention, the cache maintained by the database server may be used to great advantage, as compared to the OS kernel-level cache discussed above, to allow for recently read blocks to be stored and accessed without even transitioning into the NFS client 208 of host 202 and accessing NAS storage, as the database maintains cache coherence and consistency of the data. Indeed, should file system caching be used, as administered by conventional OS kernel based NFS client models, blocks accessed by the database process would be cached by the file system cache. While this is an efficient model for applications that does not have their own caching model, modern databases have advanced buffer cache protocols. Caching both at the NFS level and at the database level would result in the data being cached in two places and would, therefore, result in an inefficient use of physical memory. Using a file system (such as NFS) cache not only results in double buffering, but can also result in loss of data integrity in a RAC environment. If the data is cached in filesystem cache, then the changes made by a node in a RAC configuration may not be seen by other nodes unless the data is presented through a cache coherent clustered file system.

However, using an implementation of dNFS according to the present invention, the database may advantageously use the frequency of the data access (the relevancy of the block) and the importance of the block when deciding whether a block needs to be cached. Therefore, the dNFS client 208 according to embodiments of the present invention does not use file system caching (which should be switched off through use of a special mount option or specifying an additional flag parameter in the open system call), leaving all such caching duties to the database. Indeed, since dNFS bypasses the file system within the OS kernel, leaving the data to be stored in the more efficient database buffer cache.

Recall that embodiments of the present invention call for each foreground (shadow) process to have a socket (network) connection to the NFS server that administers the NAS. In such a configuration, a plurality of Network Interface Cards (NIC devices) are configured (one for each connection), to achieve scalability and high availability. Conventionally, configuring the NIC device or devices was carried out through a driver in the OS kernel. The need to provide multiple NIC devices configured with NAS storage in a data center environment may arise for many reasons. An increase in database size due to application growth will require a higher bandwidth to access the data. In this case, an NFS server administering the NAS coupled through a single NIC device (such as a Gigabit Ethernet (803.3z) card, for example) may not be able to provide the needed performance. Hence the need to provide one or more additional NIC devices to meet the increase in demand for bandwidth to access the data.

Higher bandwidth NIC devices may be available and such devices may be deployed when an increase in data usage is observed. For example, a user whose data access bandwidth increased from 120 MBPS (supported through 1 gigabit) to 400 MBPS may decide to replace a 1 Gigabit card with 4 Gigabit card. However, this solution is a costly one, as it is currently much less expensive to use four 1 Gigabit NIC devices than a single 4 gigabit NIC device. This trend, it is believed, will continue, even as the available bandwidth per NIC device increases and prices decreases.

One solution is to simply increase the number of NIC devices to handle the increased bandwidth requirements. Indeed, system administrators may decide to use multiple NIC devices to achieve high availability in the case of a physical failure of one or more of the available NIC devices, as configuring multiple NICS between the host and the storage protects the database application from failures in the network interface and increases the likelihood that the data will always be available. Redundant Array of Independent Network Interfaces may provide an additional level of protection from common physical failures.

For at least the above mentioned reasons, database users often configure their network storage with multiple NIC devices for both scalability and availability. But achieving both scalability and high availability (when possible) from multiple NIC devices is costly, both in terms of price and complexity. Link aggregation technologies, which allows multiple physical links to be used as a single network path, are often proprietary to particular network vendors and typically work only with a predetermined type of network switch. Such link aggregation or network trunking devices are generally not customized to the specific application with which they are eventually used and any type of load balancing that is carried out in the name of scalability is necessarily carried out in an application-generic manner.

When it is possible to configure such multiple NIC devices (which is not believed to be always the case), the user is required to slog through a laborious process of configuring these multiple NIC devices to enable such features, if possible at all. For example, a virtual connection may conventionally be configured, which virtual connection is layered on top of the available physical connections. Thereafter, the virtual connection is specified as the path between the NAS server and the server process. In such a conventional scenario, a primitive form of high availability may be achieved by specifying a primary NIC device and one or more secondary NIC device. In such a configuration, when the primary NIC device fails, the virtual connection falls back onto the first of the secondary NIC devices. Upon failure of the first one of the secondary NIC devices, the virtual connection then falls back onto the second of the secondary NIC devices, and so on.

As direct NFS, according to embodiments of the present invention, maintain an open socket connection to the NAS server and as all data requests are handled through the server process and not the NFS client in the OS kernel, direct NFS is in an ideal position to manage network resources such as the multiple NIC devices and sockets maintained by such multiple NIC devices.

Accordingly, further embodiments of the present direct NFS model configure multiple NIC devices to provide both high availability and scalability (among other advantages), while efficiently bypassing the NFS client (if present) in the OS kernel. According to this embodiment, users may configure multiple NIC devices and provide both load balancing and fault tolerant capabilities where none existed before. According to embodiments of the present invention, users are provided with the ability to create a NIC configuration file that specifies the NAS server 210 as well as the different network paths that may be be used to access the NAS server through the NFS server 210. For example, such a NIC configuration file may have the form as shown in FIG. 4, at reference numeral 402. In FIG. 4, "server" 404, 410 is the name of the NFS server(s) that access the NAS(s); "path" specifies up to four (for example) network paths (which may include a network switch, as shown at 502 in FIG. 6) to the NFS server, specified either by IP address as shown at 406, or by name as shown at 412, as displayed using the ifconfig command. "export" 408, 414 specifies the local mount point for the specified NFS server is also provided in the NIC configuration file. FIG. 6 is a block diagram of the NIC configuration shown in FIG. 4, with like reference numerals denoting like elements.

According to an embodiment of the present invention, when a file on a remote NAS server (e.g., MyDataServer1 in the example developed relative to FIGS. 4, 5 and 6) is accessed, the server process makes a connection across all different paths (specified by IP address 132.34.35.12 and 132.34.35.13) specified for the MyDataServer1 in the NIC configuration file 402. Later when I/O requests are submitted to different files on the MyDataServer 1 NAS server, such requests may be advantageously submitted across both specified paths, thereby providing a highly scalable solution. A round robin (for example) technique may be employed to choose which socket to use next for the I/O request. Indeed, when multiple NIC devices are coupled to the same storage server, dNFS according to embodiments of the present invention tries to use all available network paths by sending requests across all paths. To do so, each server process may be assigned one of the network paths specified in the NIC configuration file in a round-robin fashion (for example). Indeed, as shown at FIG. 5, foreground (shadow) processes P1, P3, P5 and P7 are assigned Path 1 (specified in the NIC configuration file) and foreground (shadow) processes P2, P4, P6 and P8 are assigned Path 2 (also specified in the NIC configuration file). In this manner, all of the network paths specified in the NIC configuration file to be used in substantially equal share and allows a process to send all its requests through a predetermined assigned path. Using a single path for each server process results in a better wait model when waiting for response from the NAS server. According to further embodiments, the number of NFS operations (especially read and write operations) and the amount of data that is sent across each of the network paths may be logged and may thereafter be used to insure that the load is balanced across all available network paths. If the traffic across one or more of the network paths is substantially larger or smaller than across others, adjustments to the network path to server process assignments may be made.

According to embodiments of the present invention, the server process is configured to detect when a socket is no longer available due, for example, to an existing active NIC device experiencing a failure. When such a failure is detected, the server process may immediately undertake corrective action to mitigate the effects of the failure. At the outset, the NIC configuration file may be suitably updated to indicate the unavailability of the failed path or otherwise suitably update the list of available paths. For example, all pending NFS operations on a path may be tracked by the server process and when a failure is noticed, these operations may be promptly submitted through another path specified in the NIC configuration file that has not experienced such a failure. Such a methodology provides fault tolerance in accessing the NAS storage for database server processes. Indeed, not only does the present direct NFS provide failover support upon detection of a faulty NIC, embodiments of the present invention may also provide a self healing feature by periodically pinging the inoperative network path/socket that went offline. This allows the present server process to promptly recognize when a previously disabled path becomes available again. Upon detection of a newly available path/socket, the server process adds the newly-available path/socket back into the pool of available paths and may suitably update the NIC configuration file. According to embodiments of the present invention, such a methodology allows customers to use multiple NIC devices for load balancing and high availability configurations without any support from OS vendors.

Some database files are more critical than others. For example, redo log files (which record all changes made to user data and that enable recovery operations in the case of failure of the database) are an example of such critical files. For the database server processes that maintain such files, the NIC configuration file may specify a dedicated NIC device for transmitting log redo files. Moreover, to maintain availability in the presence of failure, the socket to which the dedicated NIC device is coupled may also be coupled to a fallback NIC device, which will insure that the redo log file data may be transported across the socket connection even when the dedicated NIC device fails.

Each server process, according to embodiments of the present invention, may keep track of all the outstanding requests to a particular NFS server in its internal state. Once an NFS server fails to respond after the expiry of a predetermined (and user-selectable) timeout value due to a failure of its currently assigned connection (NIC device and/or socket), the process server may be configured so as to stop using that connection and to re-send all its request using a different connection that is configured in the NIC configuration file. This failover method contributes to making the database highly available.

The NIC configuration file may be used to effectively set the priority of one database over another on a single host machine. For example, if a host machine is running two different types of databases including a high priority database and a low priority database, the low priority database may be configured with just one NIC device and one network channel whereas the relatively higher priority database may be configured with a plurality of NIC devices and a corresponding plurality of channels. Such an application-specific allocation of channels is believed to be a distinct advantage over conventional implementations at the OS or hardware level.

Figure 7:
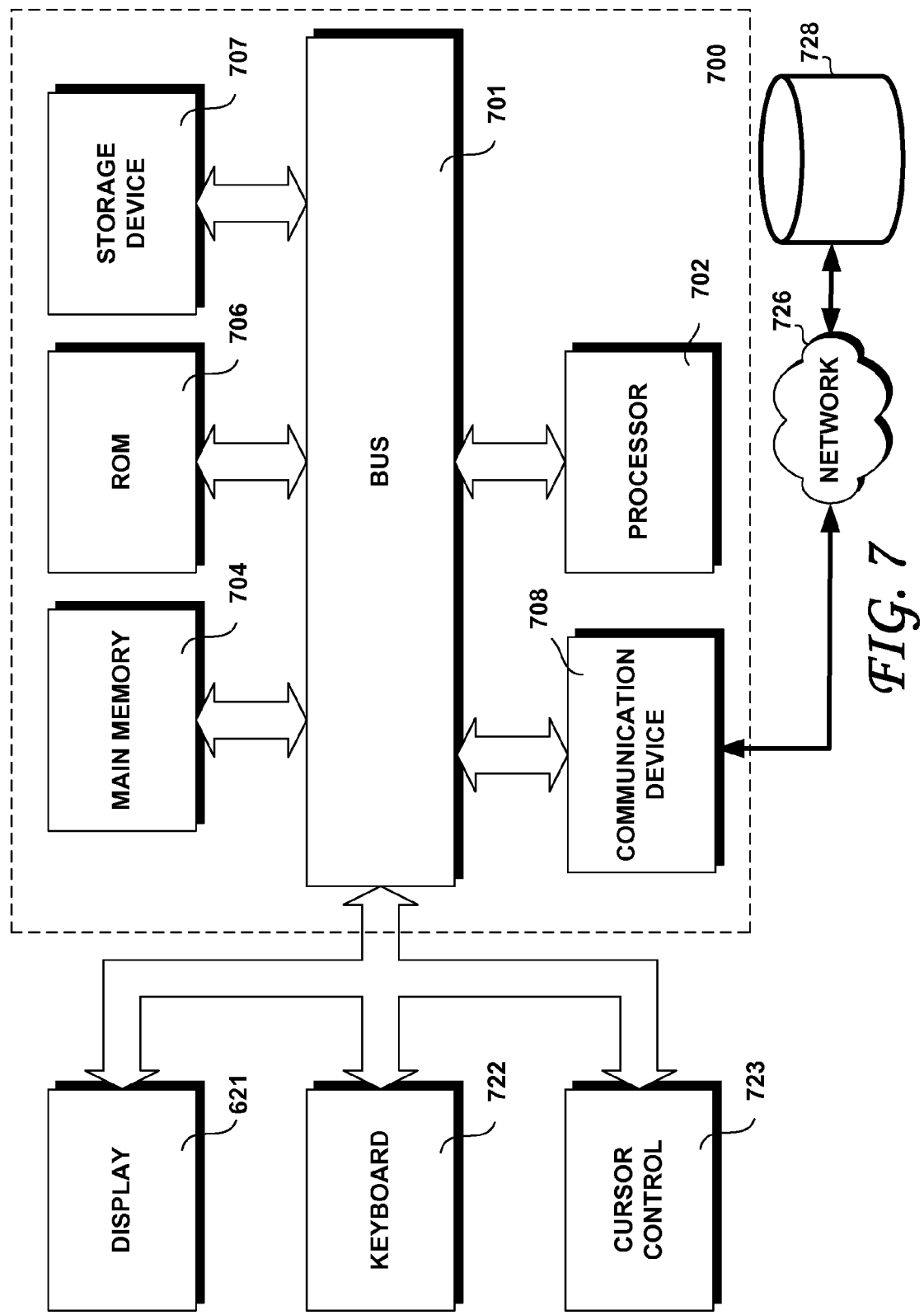
FIG. 7 is a block diagram of a computer with which embodiments of the present invention may be practiced.

FIG. 7 illustrates a block diagram of a computer system 700 upon which embodiments of the present inventions may be implemented. Computer system 700 may include a bus 701 or other communication mechanism for communicating information, and one or more processors 702 coupled with bus 701 for processing information. Computer system 700 further comprises a random access memory (RAM) or other dynamic storage device 704 (referred to as main memory), coupled to bus 701 for storing information and instructions to be executed by processor(s) 702. Main memory 704 also may be used for storing temporary variables or other intermediate information during execution of instructions by processor 702. Computer system 700 also may include a read only memory (ROM) and/or other static storage device 706 coupled to bus 701 for storing static information and instructions for processor 702. A data storage device 707, such as a magnetic disk or optical disk, may be coupled to bus 701 for storing information and instructions. The computer system 700 may also be coupled via the bus 701 to a display device 721 for displaying information to a computer user. An alphanumeric input device 722, including alphanumeric and other keys, may be coupled to bus 701 for communicating information and command selections to processor(s) 702. Another type of user input device is cursor control 723, such as a mouse, a trackball, or cursor direction keys for communicating direction information and command selections to processor 702 and for controlling cursor movement on display 721. The computer system 700 may be coupled, via a communication device (e.g., modem, NIC) to a network 724 and to a database stored in a NAS server 726.

Embodiments of the present invention are related to the use of computer system and/or to a plurality of such computer systems to access NFS data. According to one embodiment, the methods and systems described herein may be provided by one or more computer systems 700 in response to processor(s) 702 executing sequences of instructions contained in memory 704. Such instructions may be read into memory 704 from another computer-readable medium, such as data storage device 707. Execution of the sequences of instructions contained in memory 704 causes processor(s) 702 to perform the steps and have the functionality described herein. In alternative embodiments, hard-wired circuitry may be used in place of or in combination with software instructions to implement the present invention. Thus, the present invention is not limited to any specific combination of hardware circuitry and software. Indeed, it should be understood by those skilled in the art that any suitable computer system may implement the functionality described herein. The computer system may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory external to the microprocessor, or integrated with the microprocessor. In another embodiment, the instructions may be stored on a disk and read into a volatile semiconductor memory before execution by the microprocessor.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computer-implemented method of implementing a network file system, comprising:
providing a host computer system, the host computer system including a processor and a memory, the memory storing:
an Operating System (OS) that includes a kernel,
a first Network File System (NFS) client implementing a Network File System (NFS) protocol in the kernel, and
a database server process that includes a second NFS client implementing the NFS protocol in the database server process;
providing a NFS server computer system in communication with the host computer system;
providing at least one device implementing a Network Attached Storage (NAS) protocol, the at least one NAS device in communication with the NFS server computer system;
generating a first NFS request with the second NFS client in the database server process to access data stored in the NAS device with the processor associated with the host computer system; and
sending, from the second NFS client in the database server process, the first NFS request directly to the NFS server computer system with the processor associated with the host computer system completely bypassing the first NFS client in the kernel in the OS of the host computer system.

2. The computer-implemented method of claim 1, further comprising:
generating with the second NFS client in the database server process a request for an NFS file handle and requesting the NFS file handle from the NFS server computer system;

receiving the requested NFS handle at the second NFS client; and storing the received NFS handle in a shared memory area that is accessible to other processes within the database server process.

3. The computer-implemented method of claim 2, further comprising:

generating, with a first database process, a first pointer to the file handle stored in the shared memory area and storing the generated first pointer in a first local file structure accessible to the first database process; and a generating, with a second database process, a second pointer to the file handle stored in the shared memory area and storing the generated second pointer in a second local file structure accessible to the second database process.

4. The computer-implemented method of claim 2, further comprising:

generating a respective first and second NFS requests to the NFS server computer system with the first and second database processes to access data stored in the at least one NAS device, each of the first and second database processes using the NFS handle stored in the shared memory area; and sending the respective first and second NFS requests to the NFS server computer system with the processor associated with the host computer system.

5. The computer-implemented method of claim 4, further including servicing both first and second NFS requests from the second NFS client in the database server process completely bypassing the first NFS client in the kernel in the OS of the host computer system.

6. The computer-implemented method of claim 2, further comprising:

generating a second NFS request to access the data stored in the at least one NAS device without requesting the NFS file handle from the NFS server computer system; and sending, from the second NFS client in the database server process, the second NFS request directly to the NFS server computer system with the processor associated with the host computer system completely bypassing the first NFS client in the kernel in the OS of the host computer system.

7. The computer-implemented method of claim 2, further including freeing the shared memory area for use by another database process when a file object referenced by the requested, received and stored file handle is closed.

8. The computer-implemented method of claim 1, wherein the OS includes functionality to cache of frequently used blocks of data and wherein the method further includes switching off the file system caching functionality of the OS and enabling the database server process to administer caching of the frequently used blocks of data.

9. The computer-implemented method of claim 1, further including coupling a plurality of NIC devices between the NFS server computer system and the host computer system, each NIC device providing a socket connection between the database server process of the host computer system and the NFS server computer system completely bypassing the first NFS client in the kernel in the OS of the host computer system.

10. The computer-implemented method of claim 9, further including generating a NIC configuration file, the NIC configuration file including an identification of at least the NFS server computer system, a plurality of network paths to the identified NFS server computer system, and at least one local mount point for each identified NFS server computer system.

11. The computer-implemented method of claim 10, further including assigning each process of the database server process that requests access to the data stored in the at least one NAS device from the NFS server computer system to one of the plurality of network paths included in the NIC configuration file.

12. The computer-implemented method of claim 11, wherein the assigning step is carried out in a round-robin fashion.

13. The computer-implemented method of claim 11, further including monitoring each of the plurality of network paths and, upon failure of a monitored network path, reassigning the process assigned to the failed network path to another one of the monitored network paths and updating the NIC configuration file to reflect the failed network path.

14. The computer-implemented method of claim 13, further including detecting when a failed network path becomes newly available and updating the NIC configuration file to reflect the availability of the newly available network path.

15. The computer-implemented method of claim 9, comprising dedicating one of the plurality of NIC devices to a predetermined process with the database server process.

16. The computer-implemented method of claim 15, further comprising providing a fallback NIC device to the dedicated NIC device assigned to the predetermined process within the database server process.

17. A computer system for implementing a network file system, the computer system comprising:

a host, the host including:
   at least one processor;
   at least one data storage device coupled to the at least one processor the at least one data storage device configured to store an Operating System (OS) that includes a kernel, a first Network File System (NFS) client implementing a Network File System (NFS) protocol in the kernel, and a database server process that includes a second NFS client implementing the NFS protocol in the database server process;

a NFS server computer system in communication with the host;

a device implementing a Network Attached Storage (NAS) protocol in communication with the NFS server computer system; and wherein the at least one data storage device of the host is further configured to store instructions for a plurality of processes spawned by the at least one processor, the processes including processing logic for:

generating a first NFS request with the second NFS client in the database server process to access data stored in the NAS device; and sending, from the second NFS client in the database server process, the first NFS request directly to the NFS server computer system completely bypassing the first NFS client in the kernel in the OS of the host.

18. A computer-implemented method of implementing a network file system, comprising:

generating, with one or more processors associated with a computer system having an operating system (OS) that includes a kernel and a first Network File System (NFS) implementing a Network File System (NFS) protocol in the kernel, an NFS request in a second NFS client implementing the NFS protocol in a database server process of the computer system to access data stored in a Network Attached Storage (NAS) device accessible to the computer system;

sending, from the second NFS client in the database server process, the NFS request directly to an NFS server computer system in communication with the NAS device with the one or more processors associated with the computer system completely bypassing the first NFS client in the kernel in the OS of the computer system;

receiving, at the database server process, an NFS file handle from the NFS server computer system in response to the NFS request; and storing, in a memory area of the database server process shared with other processes in the database server process that is separate from a memory area where the OS kernel stores NFS file handles for the first NFS client in the kernel in the OS of the computer system, the NFS file handle such that the NFS handle is accessible to the other processes within the database server process.

19. A non-transitory computer-readable medium storing computer-executable code for implementing a network file system in a computer system having an Operating System (OS) that includes a kernel, a first Network File System (NFS) client implementing a Network File System (NFS) protocol in the kernel, and a database server process that includes a second NFS client implementing the NFS protocol in the database server process, the computer-readable medium comprising:

code for generating an NFS request in the second NFS client to access data stored in a Network Attached Storage (NAS) device accessible through a Network File System (NFS) server computer system;

code for sending, from the second NFS client in the database server process, the NFS request directly to the NFS server computer system completely bypassing the first NFS client in the kernel in the OS of the computer system;

code for receiving, at the database server process, an NFS file handle from the NFS server computer system in response to sending the first NFS request; and code for storing, in a memory area of the database server process shared with other processes in the database server process that is separate from a memory area where the kernel in the OS stores NFS file handles for the first NFS client in the kernel in the OS of the computer system, the NFS file handle such that the NFS handle is accessible to the other processes within the database server process.

* * * * *

UNITED STATES PATENT AND TRADEMARK OFFICE
CERTIFICATE OF CORRECTION

| | |
|---|---|
| PATENT NO. | : 8,239,486 B2 |
| APPLICATION NO. | : 12/051816 |
| DATED | : August 7, 2012 |
| INVENTOR(S) | : Susairaj et al. |

Page 1 of 1

It is certified that error appears in the above-identified patent and that said Letters Patent is hereby corrected as shown below:

In column 8, line 19, delete "open( )" and insert -- open ( ) --, therefor.

In column 11, line 54, delete "may be be" and insert -- may be --, therefor.

Signed and Sealed this
Sixth Day of November, 2012

David J. Kappos
*Director of the United States Patent and Trademark Office*